US006688788B2

(12) United States Patent
Ogawa et al.

(10) Patent No.: US 6,688,788 B2
(45) Date of Patent: Feb. 10, 2004

(54) DOT-MATRIX PRINTER AND PRINTING METHOD

(75) Inventors: Kenichiro Ogawa, Nagano-ken (JP); Reiko Nomura, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/242,448

(22) Filed: Sep. 13, 2002

(65) Prior Publication Data

US 2003/0068182 A1 Apr. 10, 2003

(30) Foreign Application Priority Data

Sep. 17, 2001 (JP) ....................................... 2001-282189

(51) Int. Cl.$^{7}$ ............................. B41J 2/315; B41J 2/22; G06F 15/00

(52) U.S. Cl. ............................ 400/124.01; 400/120.09; 400/120.11; 400/120.18; 358/1.7; 358/1.9; 358/1.18

(58) Field of Search ........................ 400/124.01, 120.09, 400/120.11, 323, 120.18; 347/2, 55; 358/1.18, 1.7, 1.9; 101/93.05

(56) References Cited

U.S. PATENT DOCUMENTS 4,187,552 A * 2/1980 Verstegen ................... 358/1.8
4,216,480 A * 8/1980 Buehner et al. .............. 347/14
4,783,667 A * 11/1988 Brooks ....................... 347/195
4,856,920 A * 8/1989 Sanders, Jr. ........... 400/124.27
4,995,089 A * 2/1991 Altrieth, III ................ 382/297
5,016,195 A * 5/1991 Warp ......................... 358/1.18
5,361,330 A * 11/1994 Fujisaki et al. .............. 358/1.7
5,390,290 A * 2/1995 Hayashi et al. .............. 358/1.9
5,483,625 A * 1/1996 Robertson et al. ......... 358/1.18
5,627,661 A * 5/1997 Negishi et al. ............. 358/470
5,652,660 A * 7/1997 Seto et al. .................. 358/300
5,734,390 A * 3/1998 Sakaizawa et al. ............ 347/2
5,876,132 A * 3/1999 Zable ......................... 400/306
5,926,616 A * 7/1999 Sato et al. .................... 358/1.2
6,309,050 B1 * 10/2001 Ikeda et al. ................... 347/55

* cited by examiner

*Primary Examiner*—Andrew H. Hirshfeld
*Assistant Examiner*—Wasseem H. Hamdan
(74) *Attorney, Agent, or Firm*—Sughrue Mion, PLLC

(57) ABSTRACT

A dot-matrix printer for printing on a printing medium comprises a dot-forming section for forming dots on the printing medium; and a referenced data section to be referred to during movement of the dot-forming section, a character string to be printed being indicated as data having a predetermined resolution. Where M dots per a unit length are formable on the printing medium in a moving direction of the dot-forming section, and upon printing an N-character string per the unit length, M and N both being natural numbers, if (M÷N) is not a natural number, the resolution in the moving direction is made to be L per N-character string, L being a least common multiple of M and N, and while the dot-forming section moves across the unit length, the dot-matrix printer prints while referring to the referenced data section for L times.

4 Claims, 5 Drawing Sheets

DOT-MATRIX PRINTER AND PRINTING METHOD

CROSS-REFERENCE TO RELATED APPLICATIONS

The present application claims priority upon Japanese Patent Application No. 2001-282189 filed on Sep. 17, 2001, which is herein incorporated by reference.

BACKGROUND OF THE INVENTION

1. Field of the Invention

The present invention relates to a dot-matrix printer, and a method of printing.

2. Description of the Related Art

A representative example of a dot-matrix printer is a dot-matrix impact printer (or, a dot-impact printer). According to a dot-impact printer, a dot pattern structuring characters is formed on an image buffer of the printer based on data sent from a host such as a personal computer, and according to this dot pattern, a printing medium, such as paper, is stroke by an impact wire (or, a printing pin) to print the characters.

In a main scanning direction, there is a case where, according to a relationship between the number of dots and the number of characters to be formed on the printing medium per a unit length, an average number of dots per character does not become a natural number. For example, in a case of printing by 12 cpi (twelve characters per inch) at a dot density of 90 dpi (ninety dots per inch), in average, there will be 90÷12=7.5 dots per character on the printing medium.

However, in actuality, since the number of dots which the dot-impact printer can strike on the printing medium is a natural number, it becomes necessary to adjust the intervals between characters. For example, under the above mentioned condition of 90 dpi, 12 cpi, assume that three same characters are to be printed. A space allotted for a first character is 7 dots (1 dot for the non-character portion at the left side, 5 dots for the character portion, and 1 dot for the non-character portion at the right side); a space allotted for the second character is 8 dots (1 dot for the non-character portion at the left side, 5 dots for the character portion, and 2 dots for the non-character portion at the right side); and a space allotted for the third character is 7 dots (1 dot for the non-character portion at the left side, 5 dots for the character portion, and 1 dot for the non-character portion at the right side). Thus, spaces would have to be allotted non-uniformly.

As a result, the interval between the first character and the second character (2 dots) differs to the interval between the second character and the third character (3 dots).

Such a difference in the intervals between characters due to the relationship between the number of dots and the number of characters per unit length is not preferable from a point of view of printing quality.

If resolution of the image buffer used upon printing is increased, and dot density of printing is increased, the above situation may be avoided. For example, if the resolution of an image buffer is set at 180 per inch, and the dot-striking density with impact wires is set at 180 dpi in order to print at 12 cpi, a space allotted for one character on the printing medium becomes fifteen dots (180 dpi/12 characters). Thus, if a plurality of the same characters is printed many times, the characters may be aligned at equal intervals on the medium to be printed.

However, in the case of a dot-impact printer which prints by striking with the impact wire, in order to increase resolution of the image buffer and to increase the dot density of printing, it is necessary to decrease the size of dots and to increase the number of times to strike on the same unit area.

If impact wires are made too narrow in order to decrease the size of dots, there is fear that the strength of the impact wires decrease and the impact wires may become easy to break, or the impact wires may tear through an ink ribbon. Further, if the number of times of striking on the same unit area is increased, there is fear that the printing paper may tear. Therefore, there is naturally a limit to the narrowness of the impact wire and/or the number of times of striking, and thus, there is a case where resolution of the characters and/or dot density may not be arbitrarily increased.

SUMMARY OF THE INVENTION

The present invention has been made in view of the above and other problems, and an object of the invention is to provide a dot-matrix printer and a printing method in which characters may be uniformly arranged and printed on a to-be-printed medium even when an average number of dots per character is not a natural number, without changing the size of printing or the dot density.

In order to solve the above and other objects, one aspect of the invention is a dot-matrix printer for printing on a printing medium comprising: a dot-forming section for forming dots on said printing medium; and a referenced data section to be referred to during movement of said dot-forming section, a character string to be printed being indicated in said referenced data section as data having a predetermined resolution. In a state in which M dots per a unit length are formable on said printing medium in a moving direction of said dot-forming section, and upon printing a character string of N characters per said unit length, said M and said N both being natural numbers, if (M÷N) is not a natural number, said resolution in said moving direction is made to be a number L per said character string of N characters, said L being a least common multiple of said M and said N, and while said dot-forming section moves across said unit length, said dot-matrix printer carries out printing while referring to said referenced data section for said L times.

Further, another aspect of the present invention is a dot-matrix printer for printing on a printing medium comprising a dot-forming section for forming dots on said printing medium. In a state in which M dots per a unit length are formable on said printing medium in a moving direction of said dot-forming section, and upon printing a character string of N characters per said unit length, said M and said N both being natural numbers, said dot-matrix printer being capable of arranging said character string of N characters at equal intervals and carrying out printing, even if (M÷N) is not a natural number.

Other features of the present invention will become apparent according to the appended drawings and the disclosure of this specification.

BRIEF DESCRIPTION OF THE DRAWINGS

For a more complete understanding of the present invention and the advantages thereof, reference is now made to the following description taken in conjunction with the accompanying drawings wherein:

FIG. 5 is a diagram illustrating an example of dot-pattern-format data stored in the image buffer 45, wherein

DETAILED DESCRIPTION OF EMBODIMENTS

Summary of the Disclosure

Figure 1:
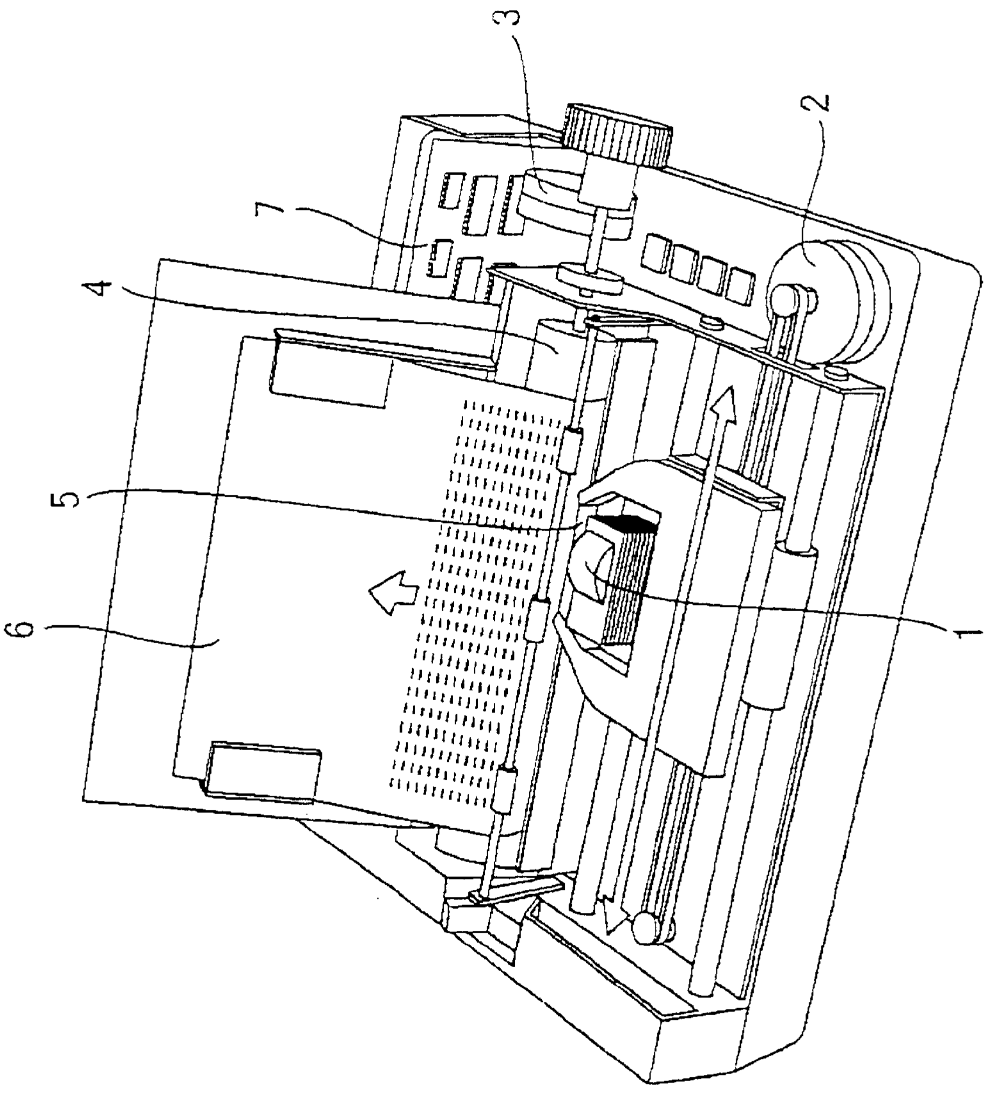
FIG. 1 is a perspective view of a dot-impact printer according to an embodiment of the present invention.

At least the following matters will be made clear by the explanation in the present specification and the description of the accompanying drawings.

One aspect of the present invention is a dot-matrix printer for printing on a printing medium comprising: a dot-forming section for forming dots on the printing medium; and a referenced data section to be referred to during movement of the dot-forming section, a character string to be printed being indicated in the referenced data section as data having a predetermined resolution. In a state in which M dots per a unit length are formable on the printing medium in a moving direction of the dot-forming section, and upon printing a character string of N characters per the unit length, M and N both being natural numbers, if (M÷N) is not a natural number, the resolution in the moving direction is made to be a number L per the character string of N characters, L being a least common multiple of M and N, and while the dot-forming section moves across the unit length, the dot-matrix printer carries out printing while referring to the referenced data section for L times.

In this way, even when (M÷N), i.e., the average number of dots allotted to a printing space for one character in the moving direction of the dot-forming section is not a natural number in a dot-matrix printer, by making the resolution, in the above-mentioned moving direction, of the character-string data in the referenced data section to be L for the character string of N characters, and by referring to the referenced data section for L times while the dot-forming section moves across the unit length, the average number of referenced times for printing one character regarding the character string of N characters may be made to be a natural number, i.e., (L÷N) times.

Here, the character string may be indicated in the referenced data section as data having the resolution so that respective characters structuring the character string are printed at uniform intervals.

Thus, by being able to print the characters forming the character string at equal intervals, the quality of printing may be improved.

Further, upon printing the character string of N characters in the state in which M dots per the unit length are formable on the printing medium in a moving direction of the dot-forming section, a period of time required for the dot-forming section to move across the unit length when the resolution of data of the referenced data section is made to be L per the character string of N characters and a referenced number of times of the referenced data section is made to be L times while the dot-forming section moves across the unit length may be made to be the same as a period of time required in a case where the resolution of data of the referenced data section is M per the character string of N characters.

Accordingly, the period of time required for the dot-forming section to move across the unit length when the resolution of data of the referenced data section is made to be L per the character string of N characters and a referenced number of times of the referenced data section is made to be L times while the dot-forming section moves across the unit length will be the same as the period of time required in a case where the resolution of data of the referenced data section is M per the character string of N characters Therefore, the character string can be printed at equal intervals between the characters and at the same printing speed as when the resolution of data of the referenced data section is M per the N-character string.

Further, another aspect of the present invention is a method of printing with a dot-matrix printer for printing on a printing medium, the dot-matrix printer comprising a dot-forming section for forming dots on the printing medium; and a referenced data section to be referred to during movement of the dot-forming section, a character string to be printed being indicated in the referenced data section as data having a predetermined resolution. In a state in which M dots per a unit length are formable on the printing medium in a moving direction of the dot-forming section, and upon printing a character string of N characters per the unit length, M and N both being natural numbers, if (M÷N) is not a natural number, the method comprises the steps of: making the resolution in the moving direction to be a number L per the character string of N characters, L being a least common multiple of M and N, and while the dot-forming section moves across the unit length, the dot-matrix printer carrying out printing while referring to the referenced data section for L times.

Thus, in a case where (M÷N), i.e., an average number of times of controlling in the moving direction of the dot-forming section allotted for printing one character does not become a natural number, resolution of character-string data of the referenced data section in the moving direction may be set to be L per the N-character string. Further, the referenced data section is referred to L times while the dot-forming section moves across the unit length. Accordingly, print control can be carried out by making the average number of referenced times to be a natural number, (L÷N) times, per printing of one character regarding an N-character string.

Another possible aspect of the present invention is a dot-matrix printer for printing on a printing medium, the dot-matrix printer comprising a dot-forming section for forming dots on the printing medium. In a state in which M dots per a unit length are formable on the printing medium in a moving direction of the dot-forming section, and upon printing a character string of N characters per the unit length, M and N both being natural numbers, the dot-matrix printer being capable of arranging the character string of N characters at equal intervals and carrying out printing, even if (M÷N) is not a natural number.

Brief Description of Dot-impact Printer

Figure 2:
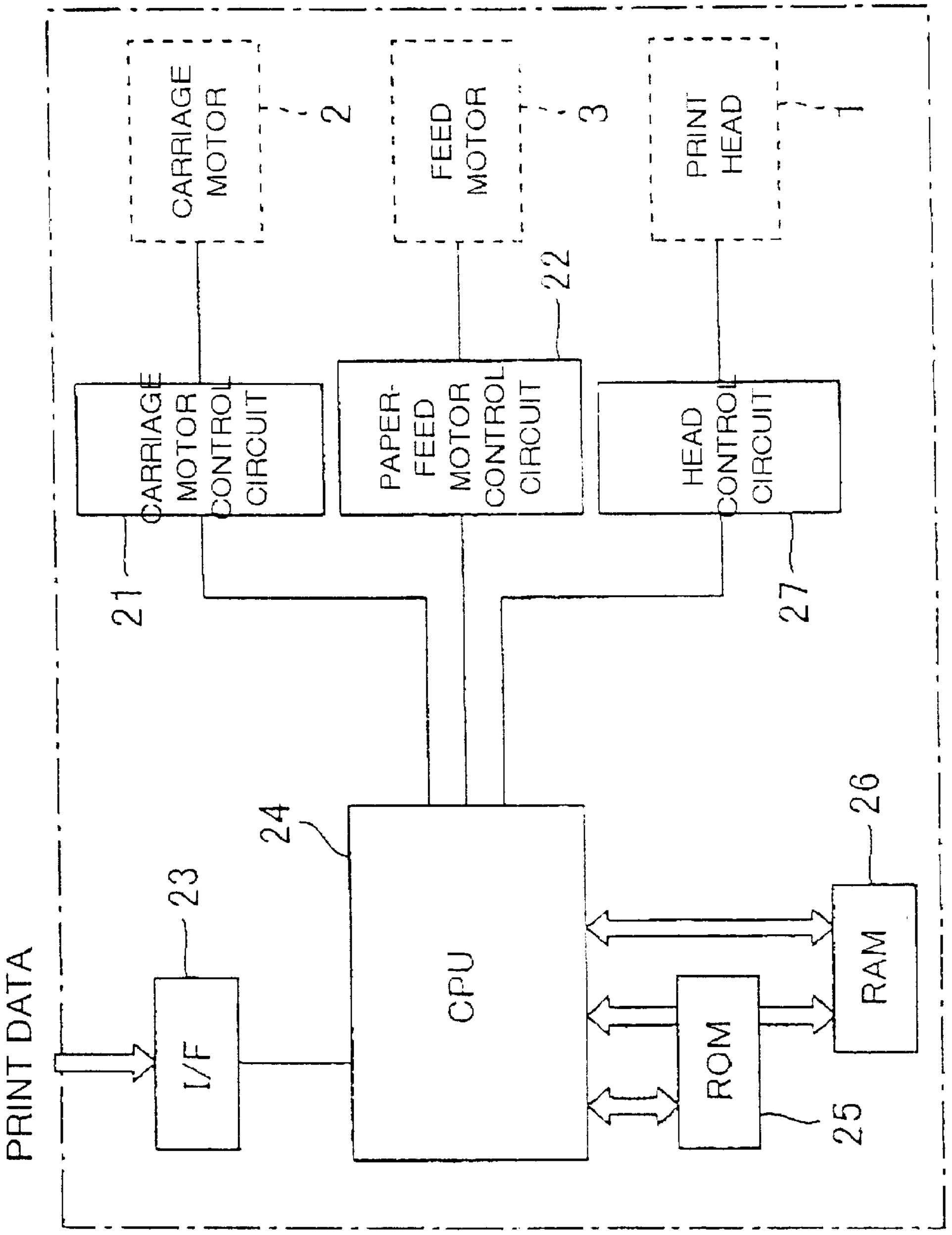
FIG. 2 is an internal block diagram showing an outline structure of a printer according to an embodiment of the present invention.

First, referring to FIG. 1 and FIG. 2, an outline of a dot-impact printer is described. FIG. 1 is a perspective view showing an outline of an external form of a dot-impact printer, an object mainly to which the present invention may be applied; and FIG. 2 is a block diagram showing an outline structure of the dot-impact printer.

The dot-impact printer is a printer in which narrow impact wires with a diameter of approximately 0.2–0.3 mm are protruded to form small dots on a printing paper 6, which is an example of a printing medium, by striking on an ink ribbon 5 with the wires. One character is expressed by an assembly of over ten dots in the vertical and horizontal directions. In Japan, a 24-dot printer comprising twenty-four impact wires and capable of improving printing quality of Chinese characters is popular.

Such a printer comprises: a print head 1, as a dot-forming section for forming dots on the printing paper 6; a control circuit 27 for this print head 1; a carriage motor 2 for moving the print head 1 to conduct printing at a predetermined position; a control circuit 21 for the carriage motor; a feed motor 3 for paper feeding; a control circuit 22 for the feed motor; an interface 23 for receiving print data from such as an external personal computer; a CPU 24 for controlling the printer based on print data input through this interface 23; a ROM 25 storing various programs for control; and a RAM 26 temporarily storing the print data.

Structure of Print Head

Figure 3:
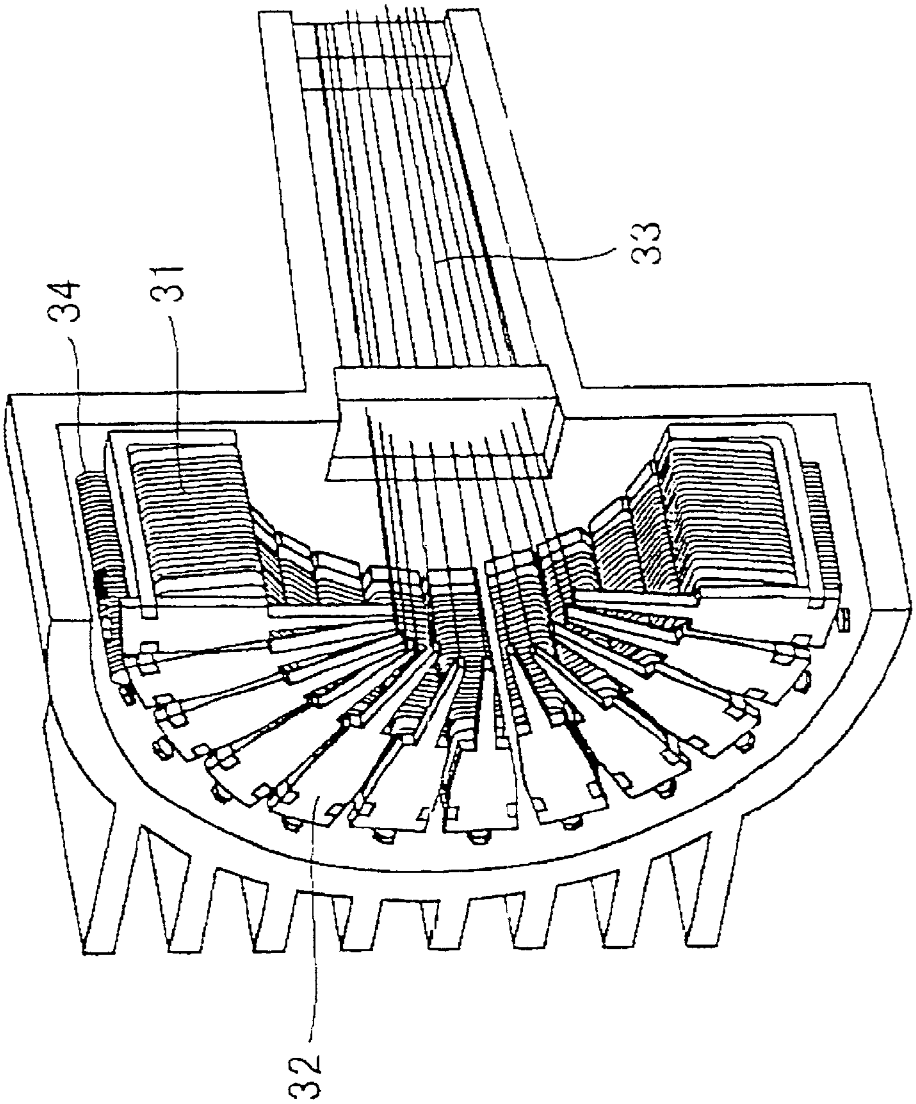
FIG. 3 is a diagram showing a print head of a dot-impact printer according to an embodiment of the present invention cut in half at the center lengthwise.

Next, referring to FIG. 3, a structure of a print head is described. FIG. 3 is a diagram showing the print head 1 of the dot-impact printer cut in half lengthwise, or vertically, at the center.

As shown in FIG. 3, the print head 1 is arranged with a plurality of head coils 31 (twenty-four in the 24-dot printer according to this embodiment) circularly. The respective head coils 31 comprises a movable piece 32 and an impact wire 33 which move integrally. That is, the impact wire 33 is fixed to a tip end of the movable piece 32 which is mounted to a base, the head coil 31 is arranged facing the movable piece 32, and a drive current is supplied to the head coil 31 so that the impact wire 33 strikes against a platen 4 by magnetic attractive force. The above-mentioned head control circuit 27 comprises a head driver for controlling passage of current to each of the head coils 31.

Note that, the twenty-four impact wires 33 are arranged capable of forming a maximum of 24 dots vertically in line at once to the printing paper 6.

Print Control of Dot-impact Printer

Next, print control of a dot-impact printer according to an aspect of the present invention is described.

Figure 4:
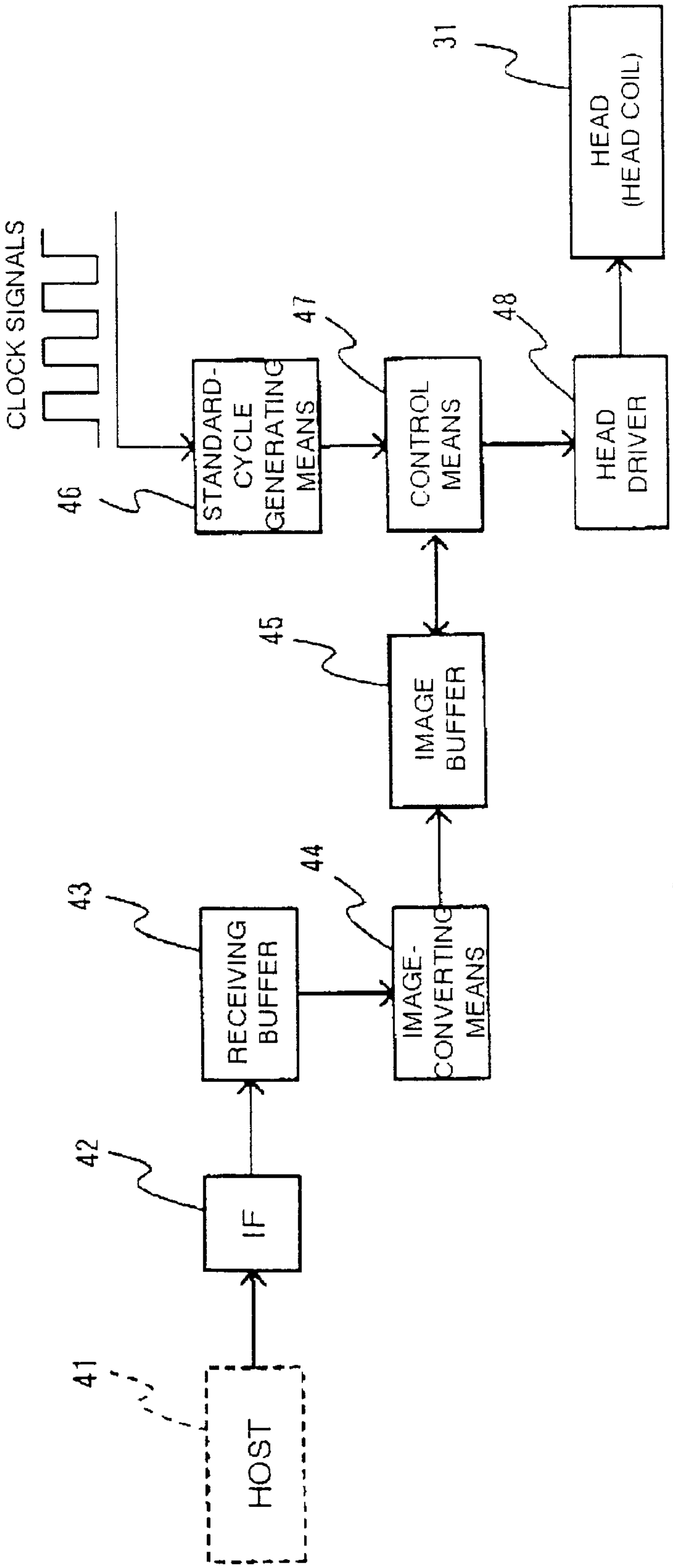
FIG. 4 is a diagram showing a part of a function of a dot-impact printer realized by the outline structure shown in FIG. 2.

First, referring to FIG. 4, explanation will be made of a processing method of print data inside the dot-impact printer. FIG. 4 is a block diagram of controlling drive of a head realized such as by the CPU 24, the RAM 26, and the head control circuit 27.

Data, such as documents created by various application software, is converted in a host 41 which provides print instructions to the printer by a printer driver dedicated to the printer into print data which is in a format processible by the printer. The print data transferred to the printer via an interface section 42 is temporarily stored in a receiving buffer 43.

An image converting means 44 reads out the print data stored in the receiving buffer 43, and converts the print data into dot-pattern-format data having a predetermined resolution. The dot-pattern-format data is indicative of whether dots are to be formed or not for every predetermined interval in the main-scanning direction. The image converting means 44 stores the dot-pattern data in an image buffer 45.

A standard-cycle generating means 46 generates a control pulse of a predetermined standard cycle based on clock signals. Note that, control means 47 can arbitrarily set the length of the standard cycle, that is, how many clocks are to structure one cycle.

The control means 47 refers to the image buffer 45 in accordance with the control pulse, and, based on the dot-pattern-format data stored in the image buffer 45, instructs a head driver 48 to drive the head coils 31.

Figure 5A:
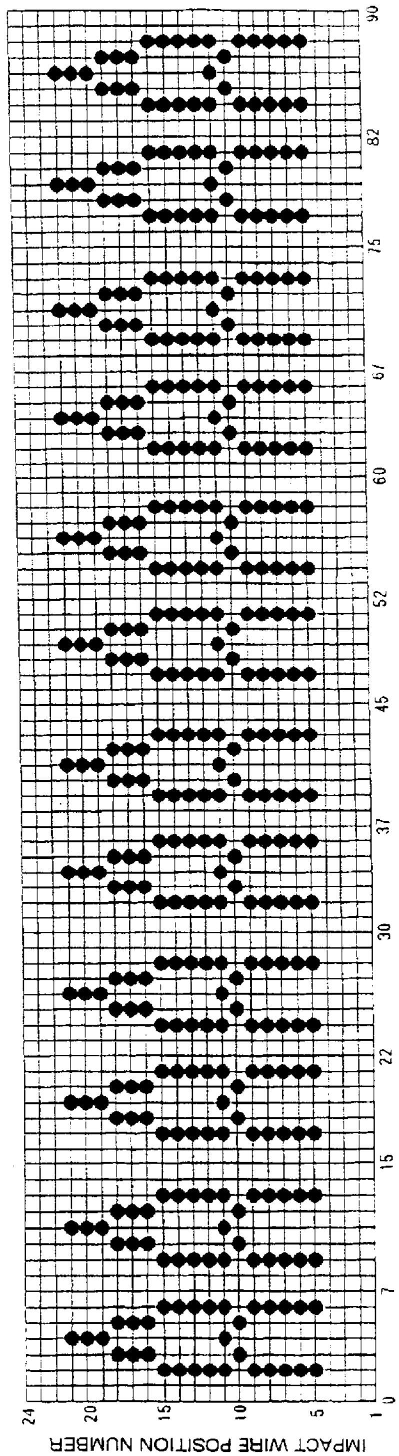
FIG. 5A shows dot-pattern-format data of a reference example.
Figure 5B:
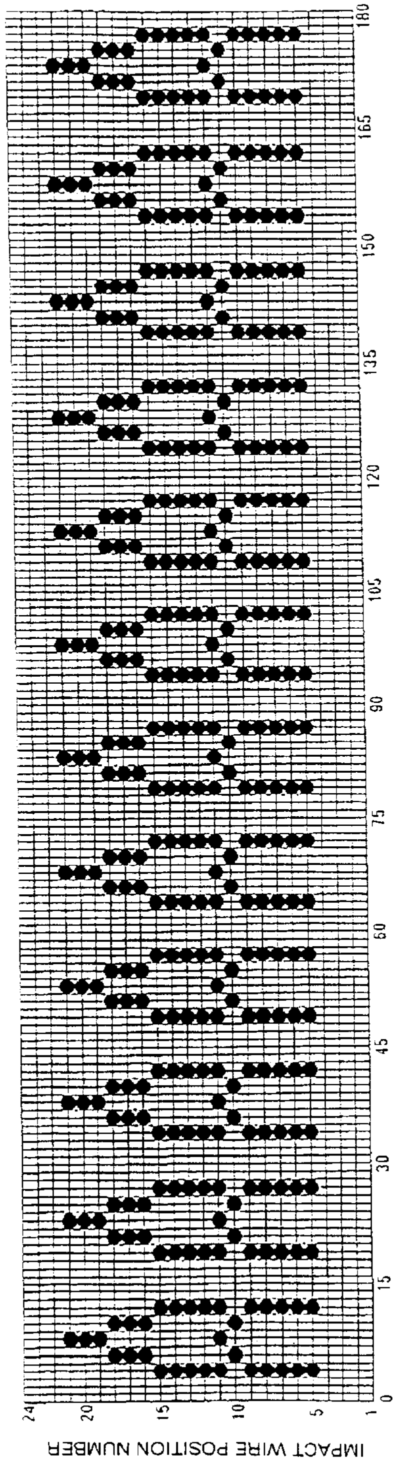
FIG. 5B shows dot-pattern-format data according to an embodiment of the present invention.

Next, referring to FIG. 5A and FIG. 5B, explanation will be made of print control according to this embodiment. FIG. 5A and FIG. 5B are diagrams illustrating examples of dot-pattern-format data stored in the image buffer 45. FIG. 5A shows dot-pattern-format data of a reference example, and FIG. 5B shows dot-pattern-format data according to the present embodiment.

As mentioned above, FIG. 5A and FIG. 5B illustrate examples of the dot-pattern-format data stored in the image buffer 45, and are further indicative of an arrangement of dots actually formed on the printing paper 6. That is, the positional relationship of the black dots in FIG. 5A and FIG. 5B match the positional relationship of dots actually formed on the printing paper 6. Therefore, a character "A" expressed by an assembly of dots in FIG. 5A, and a character "A" expressed by an assembly of dots in FIG. 5B are the same size on the printing paper 6, and are realized by the same dot arrangement.

In FIG. 5A and FIG. 5B, the vertical (ordinate) axis shows the position of each of the impact wires 33.

Further, in FIG. 5A and FIG. 5B, the horizontal (abscissa) axis shows the timing at which the control means 47 (provided for example in the CPU 24) of the printer refers to the dot-pattern-format data stored in the image buffer 45 (provided for example in the RAM 26), and the control means 47 refers to the dot-pattern-format data in the image buffer 45 at every scale of the horizontal axis in FIG. 5A and FIG. 5B. Further the scale intervals of the horizontal axis in FIG. 5A and FIG. 5B correspond to the standard cycle of the above-mentioned control pulses.

In the example shown in FIG. 5A, the control means 47 refers ninety times to the dot-pattern-format data in the image buffer 45 for a character string formed by twelve characters of "A"s; whereas in the example shown in FIG. 5B, the control means 47 refers a hundred and eighty times to the dot-pattern-format data in the image buffer 45 for the character string formed by twelve characters of "A"s.

Note that, in both the examples shown in FIG. 5A and FIG. 5B, the character string formed by twelve characters of "A"s is printed in the same period of time and across the same length (1 inch) on the printing paper 6. Thus, in the example shown in FIG. 5B, as compared to the example shown in FIG. 5A, the control means 47 refers to the dot-pattern-format data in the image buffer 45 at twice the speed (i.e., at a cycle which is half of that shown in FIG. 5A).

Further, in both FIG. 5A and FIG. 5B, when there is a black dot on coordinates (a, b), this indicates that when the image buffer 45 is referred to for the $a^{th}$ time, a dot is formed by the $b^{th}$ impact wire 33. In other words, the CPU 24 refers to each vertical line of the dot-pattern-format data at once, and if there is a black dot on a crossing point of the grid, the CPU 24 makes an impact wire 33 corresponding thereto strike a dot. From the above, it can be understood that a dot may be formed on the printing paper 6 only at the crossing point of the grid in the figures.

Here, explanation will be made of a case where printing is carried out by setting a dot density on the printing paper 6 at 90 dpi, and at 12 cpi (twelve characters per 1 inch). In this case, twelve characters are printed with a dot density forming a maximum of 90 dots while printing 1 inch on the printing paper 6. Thus, an average number of dots per character is 7.5 dots. For example, assume a case where a character "A" is to be printed continuously. If a width of the character "A" is set to be 5 dots, and spaces are to be inserted on both sides of the character to make one character have 7.5 dots, then each character may be printed at equal intervals.

In the reference example, resolution of the image buffer 45 is set at M for a character string of N characters. Further, while the print head 1 moves 1 inch, the image buffer 45 is referred to M times. That is, the image buffer 45 is referred to only the number of times of the dots formed in 1 inch by the print head 1.

Therefore, as shown in FIG. 5A, the resolution of the image buffer 45 when printing by 90 dpi, 12 cpi as mentioned above is ninety for a character string of twelve characters. Further, while the print head 1 prints the twelve-character string, that is, while the print head 1 moves one inch, the image buffer 45 is referred to ninety times.

In a case printing is conducted by using an image buffer 45 with such resolution, since the image buffer 45 is referred to once for each dot in order to form the dot as in FIG. 5A, no problem will arise if the image buffer 45 can be referred to 7.5 times for one character in order to form the dots on the printing paper 6.

However, as mentioned above, the image buffer 45 can be referred to, and also the dots can be formed only at the crossing points of the grid in the figure. Accordingly, as shown in FIG. 5A, for the first character, one-dot spaces are provided on each of the right and left sides of the first character, and seven dots are allotted for the entire first character (that is, the image buffer 45 is referred to seven times). Then, for the second character, a space consisting of one dot on the left side and a space consisting of two dots on the right side of the second character are provided to allot eight dots for the entire second character (that is, the image buffer 45 is referred to eight times). Then, for the third character, one-dot spaces are provided on each of the right and left sides of the third character, and seven dots are allotted for the entire third character (that is, the image buffer 45 is referred to seven times). Then, for the fourth character, a space consisting of one dot on the left side and a space consisting of two dots on the right side of the fourth character are provided to allot eight dots for the entire fourth character (that is, the image buffer 45 is referred to eight times). That is, upon converting the print data into the dot-pattern-format data, an adjustment is required to differ the spaces at both sides of each of the characters according to the positions for printing, even when printing the same character “A”.

As a result, as shown in FIG. 5A, for example, the interval between the first character and the second character is a space consisting of two dots (two times of reference), but the interval between the second character and the third character is a space consisting of three dots (three times of reference). That is, the intervals between each of the characters forming the character string become non-uniform.

On the contrary, in the present embodiment, the resolution of the image buffer 45 when similarly printing by M dpi, N cpi is set to be L (L being a least common multiple of M and N) for the N-character string. Further, when the print head 1 moves one inch, the image buffer 45 is referred to L times. That is, the printer head 1 refers to the image buffer 45 a number of times which is (L÷M)-folds in respect to the number of dots formed in one inch.

Therefore, the resolution of the image buffer when printing according to the above-mentioned 90 dpi, 12 cpi becomes 180 for a twelve-character string as shown in FIG. 5B. Further, while the print head 1 prints the twelve-character string, that is, while the print head 1 moves one inch, the print head 1 refers a hundred and eighty times to the image buffer 45. Further, since the moving speed of the print head 1 is the same as the moving speed in the reference example, in the present embodiment, the control means 47 refers to the dot-pattern-format data in the image buffer 45 at twice the speed (i.e., at half the cycle of the reference example) compared to the reference example.

When printing by doubling the resolution of the image buffer 45, the number of times of reference to the image buffer 45 for one character can be made to be fifteen times, that is, a natural number, as shown in FIG. 5B.

Therefore, for all characters, out of the fifteen referring times allotted to each character, the reference for the first to the third times (i.e., a total of three referring times) may be used for forming a left-side space, the reference for the fourth to the twelfth times (i.e., a total of nine referring times) may be used for actual printing of the character “A”, and the reference for the thirteenth to the fifteenth times (i.e., a total of three referring times) may be used for forming the right-side space, as shown for example in FIG. 5B. In this case, the intervals between each of the characters will all be six referring times (which is a sum of the three referring times for the left-side space of the right-hand character of the interval, and the three referring times for the right-side space of the left-hand character).

As a result, at the time of converting print data to data of the dot pattern format, it becomes unnecessary to carry out the adjustment as conducted in the reference example, i.e., the adjustment to differ the spaces on both sides of each of the characters according to the printing position even for the same characters; and, as shown in FIG. 5A, it becomes possible to print each of the characters at equal intervals on the printing paper 6.

Note that, in both the reference example shown in FIG. 5A and the present embodiment shown in FIG. 5B, the moving speed of the print head 1 is the same as mentioned above. Thus, the speed of printing characters on the printing paper 6 is the same.

Further, forming dots by one impact wire 33 is carried out, at the most, every other time reference is made to the image buffer 45 in FIG. 5A, and, at the most, once every three times reference is made to the image buffer 45 in FIG. 5B. This is a limit due to time taken from the start to the end of striking with the impact wire 33. However, if FIG. 5A and FIG. 5B are compared, it can be understood that the dot density of printing is the same for both cases (i.e., 90 dpi).

Other Points

In the above, explanation has been made of a dot-matrix printer or the like according to an aspect of the present invention based on an embodiment. The above embodiment of the invention was presented to facilitate understanding of the present invention, and does not limit the present invention in any way. The present invention may be changed or modified without departing from the scope of the invention, and it is needless to say that equivalents are included in the present invention.

For example, in the above embodiment, an impact printer was presented and described as an example. However, the present invention is not only applied to an impact printer, but may also be applied to a non-impact printer.

Further, the printing medium is not limited to the printing paper 6, but may be such as a cloth or a film.

Further, it is possible to realize a computer system comprising: a dot-matrix printer according to the above-mentioned embodiment; a computer; a display device such as a CRT; an input device such as a mouse or a keyboard; a flexible disk drive; and a CD-ROM drive device. The computer system realized in this way will be a system in which the overall system is superior to a conventional system.

According to a dot-matrix printer of one aspect of the present invention, there may be provided a printer and a printing method which capable of printing by arranging characters equally even in a case where an average dot number per character is not a natural number, without changing the size or dot density of printing.

Although the preferred embodiment of the present invention has been described in detail, it should be understood that various changes, substitutions and alterations can be made therein without departing from spirit and scope of the inventions as defined by the appended claims.

What is claimed is:

1. A dot-matrix printer for printing on a printing medium comprising:

a dot-forming section for forming dots on said printing medium; and a referenced data section to be referred to during movement of said dot-forming section, a character string to be printed being indicated in said referenced data section as data having a predetermined resolution, wherein in a state in which M dots per a unit length are formable on said printing medium in a moving direction of said dot-forming section, and upon printing a character string of N characters per said unit length, said M and said N both being natural numbers, if (M÷N) is not a natural number, said resolution in said moving direction is made to be a number L per said character string of N characters, said L being a least common multiple of said M and said N, and while said dot-forming section moves across said unit length, said dot-matrix printer carries out printing while referring to said referenced data section for said L times.

2. A dot-matrix printer according to claim 1, wherein said character string is indicated in said referenced data section as data having said resolution so that respective characters structuring said character string are printed at uniform intervals.

3. A dot-matrix printer according to claim 2, wherein, upon printing said character string of N characters in said state in which M dots per said unit length are formable on said printing medium in a moving direction of said dot-forming section, a period of time required for said dot-forming section to move across said unit length when said resolution of data of said referenced data section is made to be said L per said character string of N characters and a referenced number of times of said referenced data section is made to be said L times while said dot-forming section moves across said unit length is the same as a period of time required in a case where said resolution of data of said referenced data section is said M per said character string of N characters.

4. A method of printing with a dot-matrix printer for printing on a printing medium, said dot-matrix printer comprising a dot-forming section for forming dots on said printing medium; and a referenced data section to be referred to during movement of said dot-forming section, a character string to be printed being indicated in said referenced data section as data having a predetermined resolution, wherein, in a state in which M dots per a unit length are formable on said printing medium in a moving direction of said dot-forming section, and upon printing a character string of N characters per said unit length, said M and said N both being natural numbers, if (M÷N) is not a natural number, said method comprises the steps of:

making said resolution in said moving direction to be a number L per said character string of N characters, said L being a least common multiple of said M and said N, and while said dot-forming section moves across said unit length, said dot-matrix printer carrying out printing while referring to said referenced data section for said L times.

* * * * *